United States Patent [19]
Kenny et al.

[11] Patent Number: 5,514,837
[45] Date of Patent: May 7, 1996

[54] PLENUM CABLE

[75] Inventors: Robert D. Kenny, Oxford, Ohio; Douglas O'Brien, Richmond, Ind.

[73] Assignee: Belden Wire & Cable Company, Richmond, Ind.

[21] Appl. No.: 412,052

[22] Filed: Mar. 28, 1995

[51] Int. Cl.⁶ .................................... H01B 11/02
[52] U.S. Cl. ................ 174/113 R; 174/34; 174/110 FL; 174/110 PM; 174/121 A
[58] Field of Search .................. 174/113 R, 34, 174/115, 110 FC, 110 PM, 121 A

[56] References Cited

U.S. PATENT DOCUMENTS

| | | | |
|---|---|---|---|
| 4,041,237 | 8/1977 | Stine et al. | 174/36 |
| 4,500,748 | 2/1985 | Klein | 174/121 A |
| 4,711,811 | 12/1987 | Randa | 428/383 |
| 4,963,609 | 10/1990 | Anderson et al. | 524/413 |
| 5,162,609 | 10/1992 | Adriaenssens et al. | 174/34 |
| 5,202,946 | 4/1993 | Hardin et al. | 174/68.1 |
| 5,253,317 | 10/1993 | Allen et al. | 385/109 |

*Primary Examiner*—Morris H. Nimmo
*Attorney, Agent, or Firm*—Laff, Whitesel, Conte & Saret, Ltd.

[57] ABSTRACT

A plenum cable having a plurality of insulated conductors enclosed by a jacket. Each of the insulated conductors or twisted-pair conductors has a dielectric constant that varies ±0.25 from any other insulated conductor or twisted-pair conductor. In the preferred structure at least one twisted-pair conductor has flame retardant polyethylene or flame retardant polypropylene insulation and at least one other twisted pair conductor being insulated with fluorinated ethylene propylene, tetrafluoroethylene, or ethylenechloro-trifluoroethylene.

15 Claims, 1 Drawing Sheet

PLENUM CABLE

FIELD OF THE INVENTION

This invention relates to plenum cables having a plurality of insulated conductors insulated with the flame retardant compositions wherein all of the insulated conductors have substantially the same dielectric constant and at least one of the insulations is different. Also, the cables are particularly suitable for use in high performance plenum cables meeting EIA/TIA category-5-type requirements.

BACKGROUND OF THE INVENTION

Plenum cables are generally used in buildings where fire codes require flame retardant cables. Typically plenum data cables have two or more pairs of insulated conductors in a common jacket. The insulation can be made of several types of flame retardant insulation. A typical and widely used flame retardant insulation for conductors in data plenum cables is fluorinated ethylene-propylene (FEP Teflon®). FEP Teflon® insulation is presently in short supply and is somewhat difficult to extrude. Thus, special extrusion equipment is needed to extrude FEP Teflon®.

Due to problems with phase delay, skew and smoke and flame properties, all of the insulated conductors in the plenum cable have the same insulation.

The present invention is directed to providing a plenum cable which has other than FEP on at least one insulated conductor and therefore displaces the fluorinated ethylene-propylene on one or more plenum data cable insulated conductors and reduce the need for fluorinated ethylene-propylene insulation.

The present invention also provides a plenum cable having more than one insulated conductor surrounded by a jacket. At least one of the insulator conductors has a different insulator than another insulated conductor and all of the insulated conductors have substantially the same dielectric constant.

SUMMARY OF THE INVENTION

The present invention provides a plenum cable having a plurality of insulated conductor surrounded by a jacket. The insulated conductors in the plenum cable are insulated with at least two foamed or non-foamed insulations selected from fluorinated ethylene propylene, tetrafluoroethylene, ethylene chlorotrifluoroethylene, polyolefin, flame retardant polyolefin composition with all of the insulated conductors having a dielectric constant within ±0.25 of each other.

Dielectric constant, also referred to as permittivity is the property of an insulation which determines the velocity at which electromagnetic signals propagate along the insulated conductor. A significant variation in dielectric constant between twisted pairs of a cable can result in the signals on different twisted pairs arriving at different times at the receiving end of the cable. This is often referred to as skew.

Accordingly, it is an object of the present invention to provide a plenum cable having a plurality of insulated conductors wherein at least one of the insulations is different and all of the conductor insulations have a dielectric constant ±0.25 of each other.

It is another object of the present invention to provide a plenum cable having a plurality of twisted pair insulated conductors wherein at least a first pair of insulated conductors has a non-fluorinated insulation and at least a second pair has a halogenated insulation and said first and second pairs have a dielectric constant within ±0.25 of each other.

It is still another object of the present invention to provide a plenum cable having a plurality of twisted pair insulated conductors wherein at least a first pair of insulated conductors that has for each insulated conductor of the first pair, a flame retardant polyolefin insulation and at least a second pair of insulated conductors that has for each insulated, conductor of the second pair an insulation selected from fluorinated ethylene propylene, tetrafluoroethylene or ethylenechloro-trifluoroethylene; and said first and second pair having a dielectric constant within ±0.25 of each other.

Accordingly, it is an object of the present invention to provide a plenum cable with at least two insulated conductors having different insulations with all of the conductors having a dielectric constants ±0.25 of each other and having electrical performance consistent with category-5 type products.

DETAILED DESCRIPTION OF THE INVENTION

Figure 1:
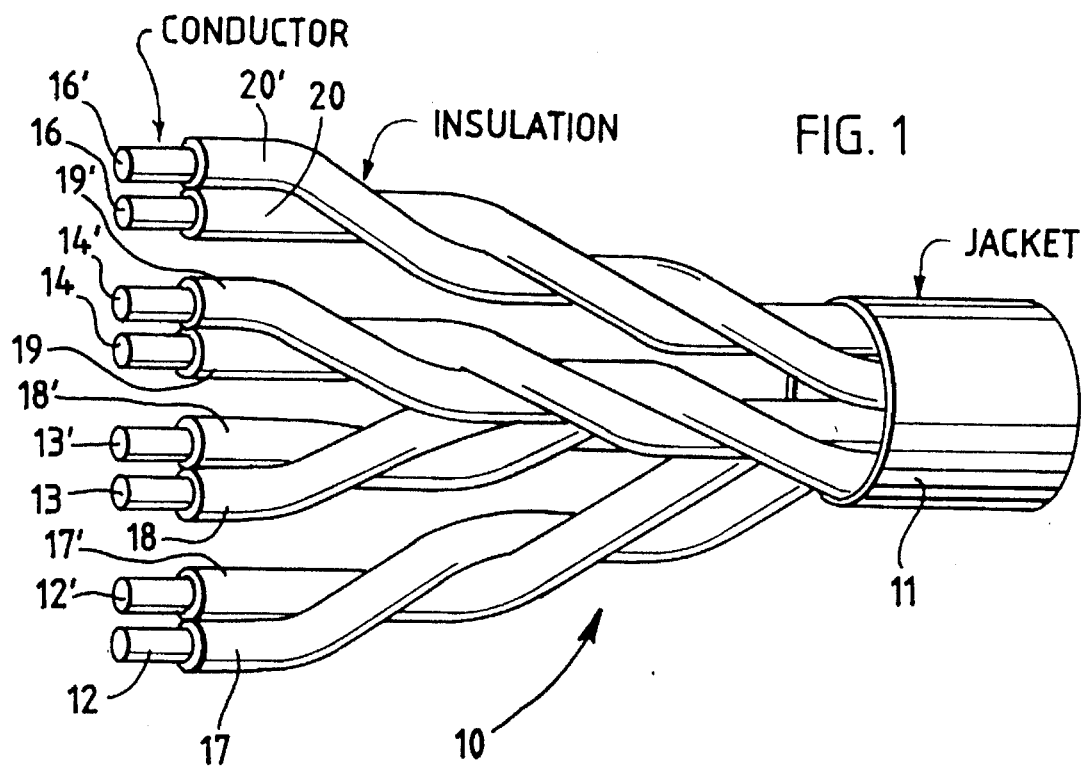
FIG. 1 shows a partial perspective view of a plenum cable of the present invention.

FIG. 1 illustrates a plenum cable 10 having a jacket 11 and, four pairs of twisted insulated conductors. Each insulated conductor has a conductor 12, 12', 13, 13', 14, 14', 16, 16' which may be any suitable data transmission conductor and a dielectric insulation 17, 17', 18, 18', 19, 19' and 20, 20' covering the respective conductor.

The conductor insulation 17 and 17' is different than the conductor insulation 18 and 18'. The conductor insulation 19 and 19' and 20 and 20' may also be different. However, as a preferred embodiment the insulations 18, 18', 19, 19', 20 and 20' are all the same.

Each twisted pair 12—12', 13—13', 14—14', 16—16' has substantially the same transmission delay from each other and varies 6%. The matching skew is achieved by the insulation and or the amount of twist in each twisted pair.

Figure 2:
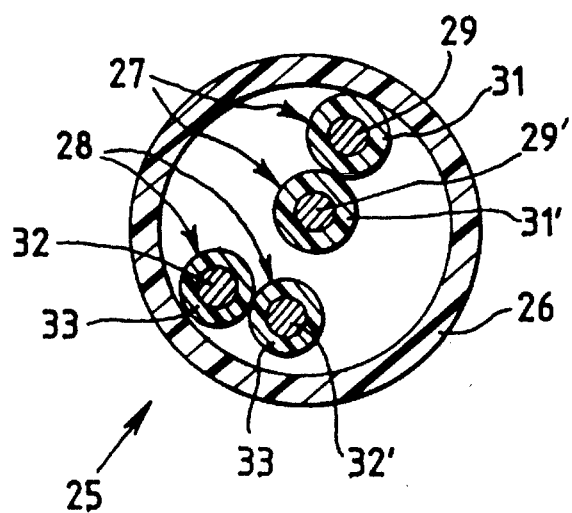
FIG. 2 shows a cross-sectional view of another plenum cable according to the present invention.

Referring to FIG. 2, there is a plenum cable 25 having a jacket 26 and two twisted-pair conductors 27 and 28. The twisted-pair conductor 27 has two conductors 29, 29' respectively being covered with insulations 31, 31'. The twisted-pair conductor 28 has two conductors 32, 32' respectively being covered with insulations 33, 33'.

The insulations 31, 31' are both the same and the insulations 33, 33' are both the same. The dielectric constant or propagation delay is determined for each of the twisted pairs.

The insulations 31, 31' are indicated as slightly foamed and the insulations 33, 33' are non-foamed insulations.

The insulations 31, 31' are the non-fluorinated insulations. Preferably, these are polyolefin based compositions. The preferred compositions for plenum cables are foamed and non-foamed polyolefins selected from flame retardant polyethylene and flame retardant polypropylene.

The insulations 33, 33' are fluorinated insulations. Preferably these are foamed and non-foamed fluorinated polyolefins commonly used for plenum cable insulations selected from fluorinated ethylene propylene (FEP) tetrafluoroethylene (TFE) and ethylene chloro-trifluoroethylene.

The conductor insulation of each pair may be of different material. However, it is preferable that the insulation of each pair is made of the same material to more readily provide the desired dielectric constant.

Because the insulations of pairs 27 and 28 would normally have differing dielectric constants, this difference in propagation delay between pairs 27 and 28 could hinder performance of systems utilizing the cable. Foaming the flame retardant polyolefin insulation 31, 31' of pair 27 will match the propagation delays of the fluorinated polyolefin insulation 33, 33' of pair 28 to less than 50 nanoseconds per 100 meters and insure system performance.

We have generally defined two of the insulations as flame retardant polyethylene and flame retardant polypropylene. These, of course, embody many of the known flame retardant polyethylene and polypropylene compositions. The flame retardant polyethylene may be the flame retardant polyethylene disclosed in U.S. Pat. No. 5,358,991 or any other known flame retardant polyethylene for plenum cables.

The jackets 11 and 26 are made from any acceptable jacket material used for plenum cables. Some of the most widely used compositions are an extruded polyvinyl chloride, fluorinated ethylene propylene, tetrafluoroethylene and Flammarrest®.

The insulation compositions of the twisted-pairs in many instances combine with each other and with the jacket compositions to provide effective flame and smoke control.

The polyolefin blend is preferably a mixture of polypropylene, very low density polyethylene and either one of or both of high density polyethylene and low density polyethylene.

The polypropylene resin provides structural strength and crush resistance to the flame retardant polyolefin composition. The amount of polypropylene present in the polyolefin composition used to form the insulation is from about 50 to about 85 parts by weight of polypropylene per hundred parts by weight of the polyolefin blend used. An example of a suitable polypropylene is PP7382 GE7 which is manufactured by Exxon and which has a density of 0.90 g/cc and melt flow rate of 4 g/10 min.

The very low density resin provides impact and low temperature performance. A preferred very low density resin is very low density polyethylene (VLDPE). VLDPE has a nominal density of below 0.910 g/cc and preferably in the range of 0.880 to 0.910 g/cc. The amount of very low density polyethylene present in the polyolefin composition is from about 10 to about 40 parts by weight VLDPE per hundred parts by weight of the polyolefin blend. An example of a very low density polyethylene is Exact 3022 made by Exxon and which has a melting point of 94° C., a density of 0.905 g/cc and a melt index (MI) of 9 g/10 min.

The polyolefin blend may also include a high and/or low density polyethylene in an amount of from about 5 to about 20 parts by weight per hundred parts by weight of the polyolefin blend. The low density polyethylene (LDPE) has a nominal density in the range of 0.910 to 0.925 g/cc. The high density polyethylene (HDPE) has a nominal density in the range of 0.941 to 0.965 g/cc. The high density polyethylene used as an example in my invention is Union Carbide's DGDL 3364 (previously DGDK 3364) which has a density at 23° C. of 0.945 g/cc, and an MI of 0.75 g/10 min.

The low density polyethylene used as an example in my invention is Union Carbide DFDA 6005 which has a density of 0.920 g/cc, an MI of 0.2 g/10 min., and a peak melting point of about 106° C.

The overall melt flow of the polyolefin blend is typically around 3.5 to 3.9 g/10 min under ASTM D1238 standards, i.e. at 230° C. and a force of 2.16 Kg. This provides milder extrusion pressure and smoother flow in the die.

The specific gravity of the polyolefin blend is about 0.918.

The polyolefin composition contains a flame retardant added to the polyolefin blend. The flame retardant is generally a mixture of halogen flame retardant chemicals, non-halogen flame retardant chemicals and a flame retardant intumescent composition. The flame retardant mixture generally contains from about 6 to about 20 parts by weight of halogen flame retardant per hundred parts by weight of the polyolefin blend and from about 20 to about 60 parts by weight of non-halogen flame retardant per hundred parts by weight of the polyolefin blend.

The preferred halogenated flame retardant is a chlorinated cyclooctene such as chlorinated dimethanodibenzo-cyclooctene. The specific compound is Dechlorane +35 which is dodecachlorododecahydro-dimethanodibenzo-cyclooctene. The chlorinated cyclooctene has a particle size of no greater than 12 microns. The halogenated flame retardant may also be selected from chlorinated wax, bromochloro wax, etc.

Dechlorane +35 is used in the polyolefin composition in an amount of from about 5 to about 15 parts by weight per hundred parts by weight of the polyolefin blend. Dechlorane +35 has a melting point of 350° C. and is made by Occidental.

The non-halogenated flame retardant may be selected from one or more of the following compounds zinc borate, aluminum trihydrate, magnesium hydroxide, zinc stannate, magnesium stearate, ammonium octamolybdate and zinc stearate.

The preferred non-halogen flame retardant is a mixture of a first non-halogen flame retardant, a second non-halogen flame retardant and a flame retardant intumescent.

The first non-halogen flame retardant is selected from one or more of zinc borate, zinc stearate, magnesium stearate, ammonium octamolybdate and zinc stannate. The preferred first non-halogen flame retardant is zinc borate. Zinc borate in the polyolefin composition is used in an amount of from about 12 to about 36 parts per by weight of zinc borate per hundred parts by weight of the polyolefin blend and is preferably about 24 parts by weight per hundred parts by weight of the polyolefin blend. In the preferred embodiment, ZB-467 Lite by Climax is used. This is a non-hygroscopic free-flowing powder having an average particle size of 1.5 microns, a water solubility of 0.1 g/100 ml, a specific gravity of 2.74 and a refractive index of 1.59. Climax has indicated that the formula is $4.ZnO.6.B_2O_3.7H_2O$.

The second non-halogen flame retardant is selected from one or more of magnesium hydroxide and magnesium stearate. The preferred second non-halogen flame retardant is FR-20 MHRM 105 which is magnesium hydroxide coated with 2% stearic acid.

The stearic acid coated magnesium hydroxide was obtained from Ameribrom under the tradename FR-20 MHRM-120. This is used in an amount of 8 to 24 parts by weight per hundred parts by weight of the polyolefin blend.

The flame retardant intumescent is a silicone powder. The preferred silicone powder used is Dow Corning's 4-7081 resin modifier which has been described as a silicone powder which has both vinyl and acrylate functionality. This is used in an amount of from about 4 to about 12 parts by weight per hundred parts by weight of the polyolefin blend.

The stabilizer in the polyolefin composition provides protection from degradation. A typical composition contains one or more hindered phenolic stabilizers and may have a secondary stabilizer. The hindered phenolic stabilizers are used in an amount of from 0.2 to 1.0 parts by weight per hundred parts by weight of the polyolefin blend. The primary hindered phenolic stabilizer in the polyolefin composition is used in an amount of from about 0.15 to about 0.5 parts by weight per hundred parts by weight of the polyolefin blend and is preferably about 0.15 parts by weight. An example of a primary stabilizer is Irganox 1010 made by Ciba Geigy. Ciba Geigy has indicated that this is tetrakis [methylene (3,5-di-tert-butyl-4 hydroxyhydrocinnamate)] methane. Likewise, the secondary hindered phenolic stabilizer is present in the polyolefin composition in an amount of from about 0.1 to about 0.5 parts by weight per hundred parts by weight of the polyolefin blend and is preferably about 0.25 parts by weight per hundred parts by weight of the polyolefin blend. An example of a secondary hindered phenolic stabilizer is Irganox MD 1024 by Ciba Geigy which has been described as having the formula 1,2-bis (3,5-di-tert-butyl-4-hydroxyhydrocinnamate) hydrazine.

Additional stabilizers are calcium stearate and Chemisorb 944 each used in an amount of about 0.05 to about 0.2 parts by weight per hundred parts by weight of the polyolefin blend and preferably about 0.10 parts by weight. The calcium stearate was purchased from Witco Chemical Company; Chicago, Ill. The Chemisorb 944, which is a polypropylene stabilizer, was purchased from Ciba Geigy.

The following Example illustrates the current insulation formulation of the inventive composition.

EXAMPLE

| Material | Mfq | Type | Parts by Weight | Ranges |
| --- | --- | --- | --- | --- |
| PP7382 | Exxon | PP | 70 | 50 to 85 |
| Exact 3022 | Exxon | VLDPE | 20 | 10 to 40 |
| DGDL 3364 | Union Carbide | HDPE | 10 | 5 to 20 |
| Dechlorane +35 | Occidental | Chlorinated | 12 | 6 to 20 |
| 4-7081 | Dow Corning | FR Intumescent | 7.8 | 4 to 12 |
| ZB-67 lite | Climax | FR Non-Halogen | 24 | 12 to 36 |
| FR-20 MHRM 105 | Ameribrom | FR Non-Halogen | 12 | 8 to 24 |
| Irganox 1010 | Ciba Geigy | Hindered Phenolic | 0.15 | .1 to .5 |
| Irganox MD 1024 | Ciba Geigy | Stabilizer | 0.25 | .1 to .5 |
| Calcium Stearate | Witco | Stabilizer | 0.10 | .05 to .2 |
| Chemisorb 944 | Ciba Geigy | Stabilizer | 0.10 | .05 to .2 |

The compounding of the above materials is preferably processed at a temperature of 160° C. to 170° C. Likewise, the above materials are preferably extruded at temperatures between 175° C. to 210° C. onto conductors to prepare the insulated conductors. The plenum cable and twisted pairs are prepared by known procedures.

Although the Figure shows a plenum cable having four insulated twisted pair insulated conductors enclosed by a jacket, any number of twisted pairs may be used. Also, any known additional construction for the plenum cable, i.e., filler, shielding, etc., is considered as a part of this disclosure.

The mixture of insulations used in the plenum cables of our invention allow the manufacturer to have flexibility as to production and cost from current supplied of materials available and to substantially maintain uniformity in the plenum cables provided.

The foregoing is for purposes of illustration rather than limitation of the scope of protection accorded this invention. The latter is to be measured by the following claims, which should be interpreted as broadly as the invention permits.

The invention claimed is:

1. A plenum cable having a jacket enclosing a plurality of insulated conductors comprising each conductor being insulated with a type of flame retardant insulating material and said plurality of insulated conductors having at least two types of insulating material at least one or more insulate conductors having one type of insulating material and at least one or more insulated conductors having a second type of insulating material, and each insulated conductor having substantially the same dielectric constant as another insulated conductor wherein said dielectric constant of any insulated conductor varies within only ±0.25 from any other insulated conductor.

2. The plenum cable of claim 1 wherein the insulated conductors are a plurality of twisted-pair conductors with each pair having insulation selected from the group consisting of flame retardant polyethylene, flame retardant polypropylene, fluorinated ethylene propylene, tetrafluoroethylene, and ethylene chloro-trifluoroethylene; and each pair of twisted pair conductors has a dielectric constant that varies from any other twisted pair conductor in said cable within ±0.25.

3. The plenum cable of claim 2 wherein at least one twisted-pair conductor has an insulation selected from the group consisting of flame retardant polyethylene and flame retardant polypropylene and at least another twisted pair conductor selected from the group consisting of fluorinated ethylene propylene, tetrafluoroethylene, and ethylenechlorotrifluoroethylene.

4. The plenum cable of claim 3 wherein said at least one twisted pair conductor has a foamed flame retardant polyethylene insulation.

5. The plenum cable of claim 3 wherein said at least one twisted pair conductor has the flame retardant polypropylene insulation.

6. The cable of claim 3 wherein said jacket is selected from polyvinyl chloride and flame retardant polyvinyl chloride.

7. The cable of claim 4 wherein said jacket is selected from polyvinyl chloride and flame retardant polyvinyl chloride.

8. The cable of claim 5 wherein said jacket is selected from polyvinyl chloride and flame retardant polyvinyl chloride.

9. The plenum cable of claim 5 wherein said flame retardant polypropylene insulation contains a mixture of polypropylene, a very low density polyethylene and at least one of a high density polyethylene and a low density polyethylene, a mixture of flame retarding chemicals that includes a chlorinated flame retardant, and a non-halogen flame retardant, and at least one hindered phenolic stabilizer.

10. The plenum cable of claim 6 wherein the flame retardant polypropylene insulation composition comprises:

a polyolefin blend having from about 50 to about 85 parts by weight of polypropylene per hundred parts by weight of the polyolefin blend, from about 10 to about 40 parts by weight of very low density polyethylene per hundred parts by weight of the polyolefin blend and from about 5 to about 20 parts by weight of at least one of a low density polyethylene and high density polyethylene per hundred parts by weight of the polyolefin blend;

a halogenated flame retardant, in an amount from about 6 to about 20 parts by weight per hundred parts by weight of the polyolefin blend;

a flame retardant intumescent, in an amount from about 5 to about 15 parts by weight by per hundred parts by weight of the polyolefin blend;

a first non-halogen flame retardant, in an amount from about 12 to 36 parts by weight per hundred parts by weight of the polyolefin blend;

a second non-halogen flame retardant, in an amount from about 8 to about 24 parts by weight per hundred parts by weight of the polyolefin blend;

a hindered phenolic stabilizer, in an amount from about 0.2 to about 1.0 parts by weight per hundred parts by weight of the polyolefin blend; and a stabilizer in an amount from about 0.1 to about 0.4 parts by weight per hundred parts by weight of the polyolefin blend.

11. The plenum cable of claim 7 wherein said halogenated flame retardant is chlorinated cyclooctene.

12. The plenum cable of claim 8 wherein said first non-halogen flame retardant is zinc borate.

13. The plenum cable of claim 9 wherein said second non-halogen flame retardant is stearic acid coated magnesium hydroxide, said stabilizer contains calcium stearate and polypropylene, and said flame retardant intumescent is a silicone powder modifier which has both vinyl and acrylate functionality.

14. The cable of claim 9 wherein said jacket is selected from polyvinyl chloride and flame retardant polyvinyl chloride.

15. The cable of claim 10 wherein said jacket is selected from polyvinyl chloride and flame retardant polyvinyl chloride.

* * * * *

UNITED STATES PATENT AND TRADEMARK OFFICE
CERTIFICATE OF CORRECTION

PATENT NO. : 5,514,837
DATED : May 7, 1996
INVENTOR(S) : Robert D. Kenny and Douglas O'Brien It is certified that error appears in the above-indentified patent and that said Letters Patent is hereby corrected as shown below:

Column 6, line 15, change "insulate" to --insulated--.

Signed and Sealed this

Fifteenth Day of October, 1996

Attest:

BRUCE LEHMAN

Attesting Officer    Commissioner of Patents and Trademarks